No. 634,844. Patented Oct. 10, 1899.
C. C. BOWEN & C. R. TWITCHELL.
ANIMAL TRAP.
(Application filed Nov. 10, 1898.)
(No Model.) 2 Sheets—Sheet 1.
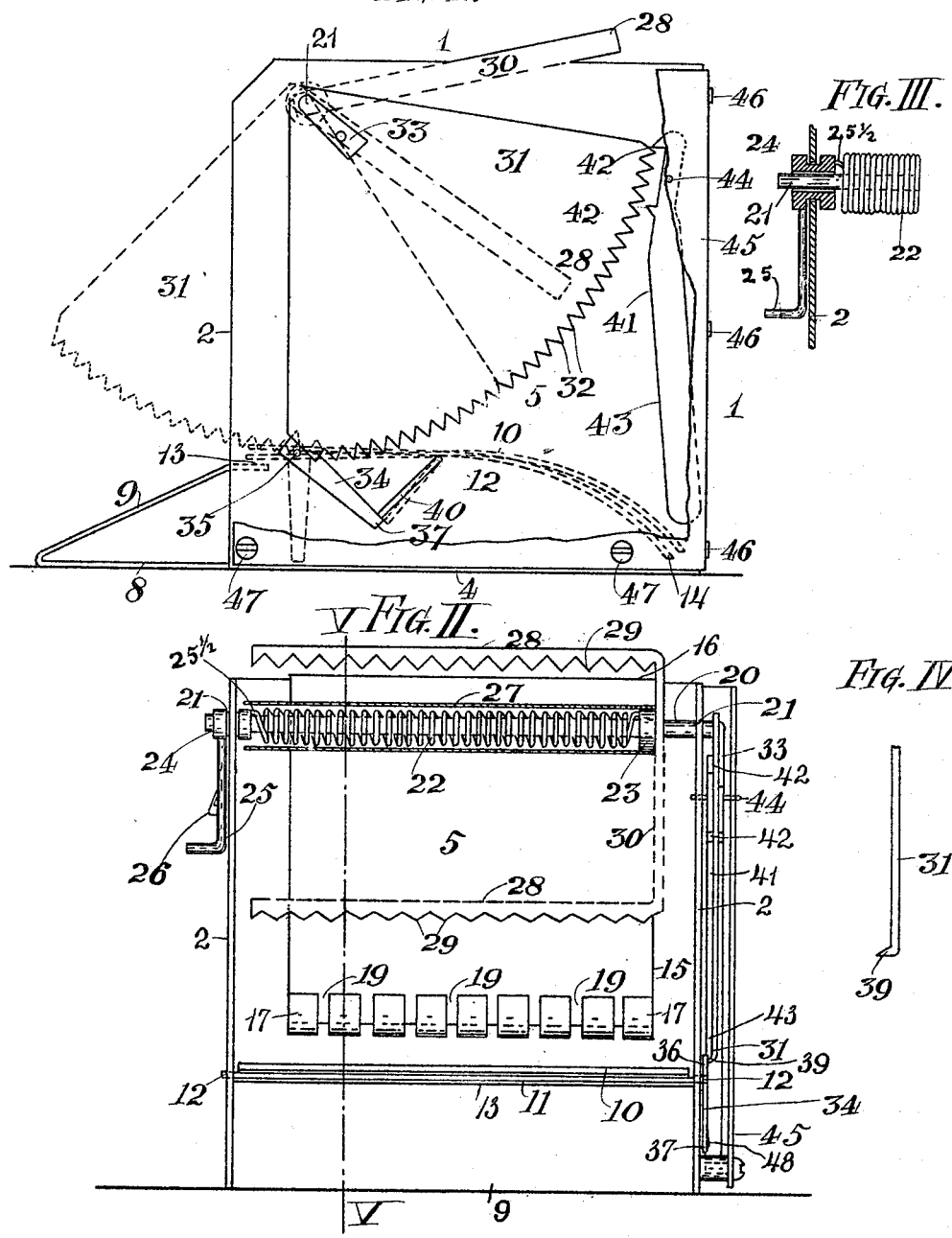

No. 634,844. Patented Oct. 10, 1899.
C. C. BOWEN & C. R. TWITCHELL.
ANIMAL TRAP.
(Application filed Nov. 10, 1898.)
(No Model.) 2 Sheets—Sheet 2.
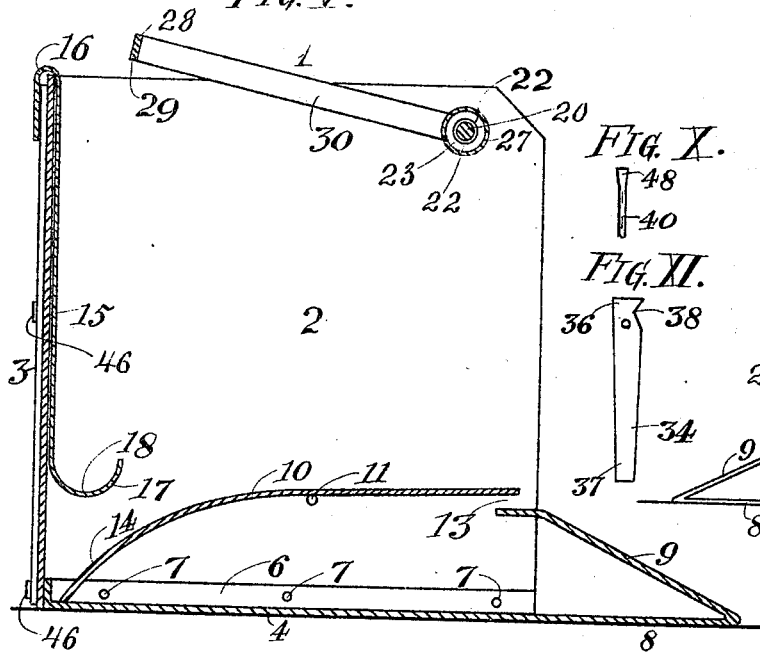
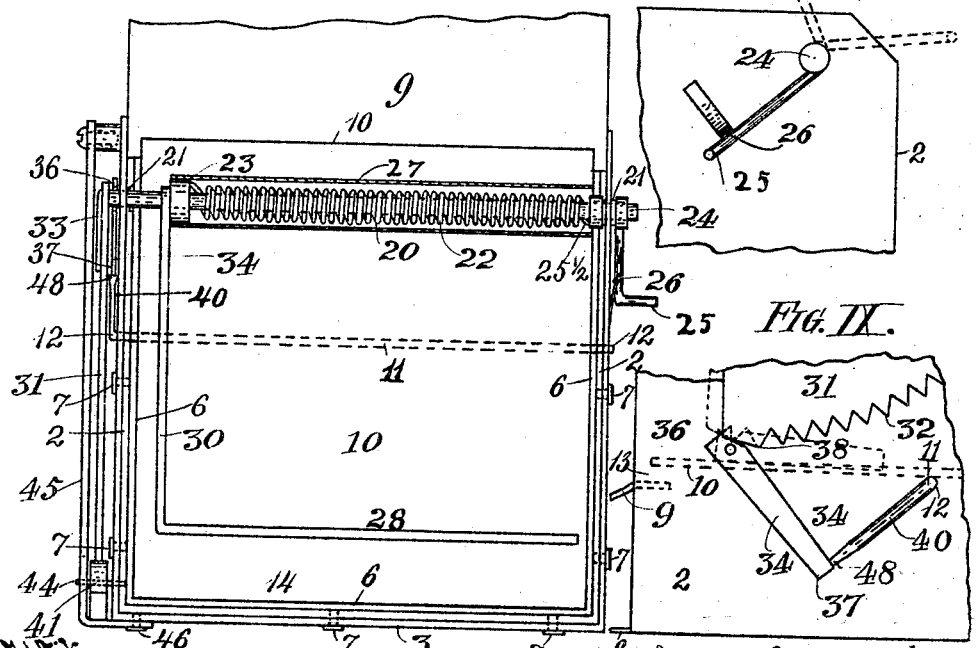
THE NORRIS PETERS CO., PHOTO-LITHO., WASHINGTON, D. C.

UNITED STATES PATENT OFFICE.

CALVIN C. BOWEN, OF LOS ANGELES, AND CHARLES R. TWITCHELL, OF SANTA MONICA, CALIFORNIA, ASSIGNORS TO WILLIAM M. BOWEN, OF LOS ANGELES, CALIFORNIA.

ANIMAL-TRAP.

SPECIFICATION forming part of Letters Patent No. 634,844, dated October 10, 1899.

Application filed November 10, 1898. Serial No. 696,062. (No model.)

*To all whom it may concern:*

Be it known that we, CALVIN C. BOWEN, residing at Los Angeles, and CHARLES R. TWITCHELL, residing at Santa Monica, in the county of Los Angeles and State of California, citizens of the United States, have invented certain new and useful Improvements in Animal-Traps, of which the following is a full, clear, and exact description, reference being had to the accompanying drawings, which form a part of this specification.

Our invention relates to that form of animal-traps in which a blow is struck sufficient to kill the animal instantaneously and throw it away from the trap; and our invention consists in features of novelty hereinafter described and claimed.

Figure I is a side elevation of our improved trap, showing the guard-plate broken away. Fig. II is a front elevation. Fig. III is an enlarged detail view of the actuating-spring, collar, and crank for winding up the spring. Fig. IV is a detail edge view of the segmental ratchet-plate. Fig. V is a longitudinal vertical section taken on line V V, Fig. II. Fig. VI is a top view, the bait-rack being omitted. Fig. VII is a side elevation showing guard-plate in position. Fig. VIII is a detail side elevation showing the crank for winding up the actuating-spring and the spring-catch for retaining said crank. Fig. IX is a detail view of the ratchet-plate, the trigger, and the notch-lever for normally holding the ratchet-plate. Fig. X is a detail top view of the trigger. Fig. XI is a side elevation of the notch-lever.

Referring to the drawings, 1 represents a square-shaped body having sides 2, a back 3, and a bottom 4, with an internal chamber 5, the front and top being open. The body is preferably made of sheet metal, but may be otherwise constructed, if found desirable. The bottom 4 may be provided with a flange 6, to which it may be riveted to the back and sides, as shown at 7. The bottom 4 is provided with an extension 8, extending out in front of the body and having a portion bent backward on an incline, as shown at 9, forming a plate over which the animal travels on its way to the trap.

10 represents a tilting table supported by a rod 11, said rod having its ends journaled at 12 to the respective sides of the body. The rear end of the table 10 is somewhat heavier than the forward end, the table thus remaining normally with its forward end in a raised position with a space 13 between the forward end of the table and the rear end of the plate 9. The inner end 14 of the table is preferably curved downwardly, so that the lower end comes in contact with the bottom of the body and limits the upward movement of the forward end.

The bait may be secured within the body by suitable means. We have shown a rack for this purpose, said rack consisting of a main portion 15, preferably being a flat plate, having its upper end formed into a hook 16 for hanging over the back plate of the body, having its lower end curved upwardly, as shown at 17, forming a trough 18, in which the bait may be placed.

19 represents a series of slots cut in the lower curved end of the bait-holder, affording means for the animal to view the bait and to be lured into the trap.

20 represents the operating-shaft, journaled at 21 in the sides of the body and in which it revolves.

22 represents the actuating-spring for revolving the shaft 20, one end of said spring being secured to a collar 23, said collar being rigidly secured to the actuating-shaft 20.

24 represents a collar or sleeve journaled in one of the side plates of the body and surrounding the shaft 20, on which it is loosely mounted, one end of the spring 22 being secured to the sleeve 24 at 25½.

25 represents a crank for revolving the sleeve 24, and as it turns independently of the shaft 20 it will be seen that the actuating-spring 22 is twisted or wound up upon the shaft 20, the shaft 20 remaining stationary while the sleeve revolves.

26 represents a spring-catch secured to the side plate and with which the crank comes in contact, said spring-catch preventing the crank from unwinding the spring when the spring is wound up.

27 represents a tubular casing surrounding the actuating-spring, having one of its ends secured to the collar 23 and its opposite end free from any support.

28 represents our improved striking-arm, which extends across the chamber 5 and is preferably provided with teeth 29 on its striking-surface, said striking-arm having a right-angle extension 30 extending to the actuating-shaft 20, to which it is secured. The striking portion of the arm being of a sufficient distance from the actuating-rod, so that in its sweep as the actuating-rod is revolved the striking-arm passes a short distance over the top of the table 10 at just the right height to strike the animal that has stepped upon the table and released the mechanism which permits the actuating-rod and striking-arm to revolve. When the striking-arm has made one revolution and returned to the position shown in full lines, (Fig. II,) its movement is stopped preparatory to making another revolution when the table has been again stepped on by a mouse or other animal. In other words, the trap automatically sets itself after each blow of the striking-arm, and this is repeated until the actuating-spring has run down or exhausted its expansive power, at which time by turning the crank 25 the spring is again wound up preparatory to causing the striking-arm to make another series of revolutions.

We will now describe the device whereby the striking-arm is arrested in its movement and is released to perform a revolution.

31 represents a ratchet-plate somewhat triangular in form, its periphery being a segment of a circle and having a series of teeth 32 thereon. At one corner of the triangle the ratchet-plate 31 is secured to the actuating-shaft 20 by the end 33 of the shaft being bent over and riveted to the ratchet-plate.

34 represents a setting-lever pivoted to the side of the body at 35, said lever having a short arm 36 and a long arm 37.

38 represents a notch in the short arm of the lever. As the ratchet-plate 31 revolves a projection 39 on one of its corners comes in contact with the notch 38 in the setting-lever 34. The ratchet-plate continuing to revolve throws the setting-lever into the position shown in full lines, Fig. IX, at which time the end of the lever comes in contact with a trigger 40, said trigger being a part of the rod 11, to which the table 10 is secured, the trigger arresting the upward movement of the setting-lever 34, thereby arresting the forward movement of the ratchet-plate 31 and stopping the revolution of the shaft 20, setting the trap for the next animal. When the animal steps on the forward end of the table 10, the rod 11 is turned in its journal-bearings and the trigger 40 is thrown backward out of engagement with the lower end of the setting-lever 34, permitting the setting-lever to pass into the position shown in dotted lines, Fig. IX, from which position it releases the ratchet-plate 31 and permits the same to perform a revolution. As the actuating-spring causes the ratchet-plate and striking-arm to revolve with great speed and force when released, we have found it desirable to provide some means for gradually reducing the speed of the striking-arm after it has accomplished its purpose of killing the animal which has stepped upon the table. In order to do this, we have provided an escapement-lever 41, having teeth 42, which engage the ratchet-teeth on the disk 31, thus gradually reducing the speed of the ratchet and striking-arm, as before stated. The escapement 41 is provided with a depending arm 43, which acts as a pendulum to the escapement. The escapement is pivoted at 44 to the protecting cover or plate 45. (See Fig. I.) The protecting-plate 45 may be secured at 46 to the back of the body and also at 47 to the side of the same. The trigger 40 has a flattened end 48 in order to provide sufficient surface to catch the edge of the setting-lever 34. In operation the actuating-spring is wound up and it only depends upon the strength of the same as to the number of revolutions accomplished by the striking-arm before the trap has run down, the sweep of the striking-arm not only killing the animal, but knocking it clear of the table 10, permitting the table to tip backward, as shown in Fig. V, thus throwing the trigger 40 into position to catch the long arm of the setting-lever and setting the trap, whereby the action may be repeated.

We claim as our invention—

1. An animal-trap comprising a body, the spring-shaft journaled in the sides of the body, a pendent segmental ratchet-plate secured to the spring-shaft, a striking-arm having an extension rigidly secured to the spring-shaft, a pivoted setting-lever, and a pivoted table adapted to engage the setting-lever when tilted forward, and a rod, on which the table is supported having a trigger adapted to engage the setting-lever when the table is released; substantially as described.

2. In an animal-trap, the combination of a shaft mounted on a body and adapted to revolve, a striking-arm on the shaft, means for arresting the movement of the shaft, an actuating-spring upon the shaft having one of its ends fixed thereto, a collar loosely mounted on the shaft to which the opposite end of the spring is secured, a crank for revolving said collar and a catch for retaining the crank, substantially as set forth.

3. In an animal-trap, the combination of a revoluble shaft a striking-arm connected therewith, a pivoted table, means in connection with said table for releasing and arresting the movement of the striking-arm, and a plate for holding bait hooked at its upper end to the body, having its lower end formed in the shape of a trough and provided with a series of slots for exposing the bait, substantially as set forth.

4. In an animal-trap, the combination of a body, a shaft journaled therein, a striking-